Jan. 7, 1964     A. HARDY     3,116,651

GEARING

Filed March 21, 1961     2 Sheets-Sheet 1

INVENTOR.
Alexander Hardy
BY
Hugh L. Fisher
ATTORNEY

INVENTOR.
Alexander Hardy
BY
Hugh L. Fisher
ATTORNEY

United States Patent Office 3,116,651
Patented Jan. 7, 1964

3,116,651
GEARING
Alexander Hardy, Detroit, Mich., assignor to General Motors Corporation, Detroit, Mich., a corporation of Delaware
Filed Mar. 21, 1961, Ser. No. 97,343
11 Claims. (Cl. 74—801)

This invention relates to the method of making a planetary gearset and to gearing of the type utilizing a plurality of pinions for transferring drive between two gears.

As is well known, with a simple planetary gearset comprising ring and sun gears, planet pinions intermeshing with the sun and ring gears, and a carrier for revolvably supporting the planet pinions, only a predetermined number of standard pinions can be equally spaced between certain sizes of ring and sun gears. This number is determined by the space index of the ring and sun gears, which is the sum of the teeth on each gear. If the number of pinions to be utilized is not a whole number factor of this space index, then equal spacing of this number of pinions is not possible and the closest quantity, either greater or smaller than this desired number, must be selected or resort must be made to unequal spacing. Of course, unequal spacing produces uneven loading as well as other problems.

With the foregoing in mind, the invention contemplates novel gearing in which carrier mounted pinions can be equally spaced although the number of pinions selected is not a whole number factor of the sum of the teeth on the two gear elements intermeshing with the pinions.

By the invention, the tooth action in a planetary gear system is so altered that the number of pinions employed need not be a whole number factor of the spaced index in order to be equally spaced on the planet carrier. Also, the tooth action is such that the synchronous vibrations from the equally spaced pinions is held to a minimum.

More specifically, it is proposed by the invention to utilize pinions with different numbers of teeth so as to permit their equal circumferential spacing on a carrier, although the number of pinions to be employed is a fractional factor of the sum of the teeth on the gears meshing with the pinions. Another objective of the invention is to alter the phasing of the pinions with respect to these gears so as to substantially eliminate the possibility of gear noise from synchronous vibrations between the intermeshing gear teeth.

The foregoing and other objects and advantages of the invention will be apparent from the following description and from the accompanying drawings in which.

Figure 1:
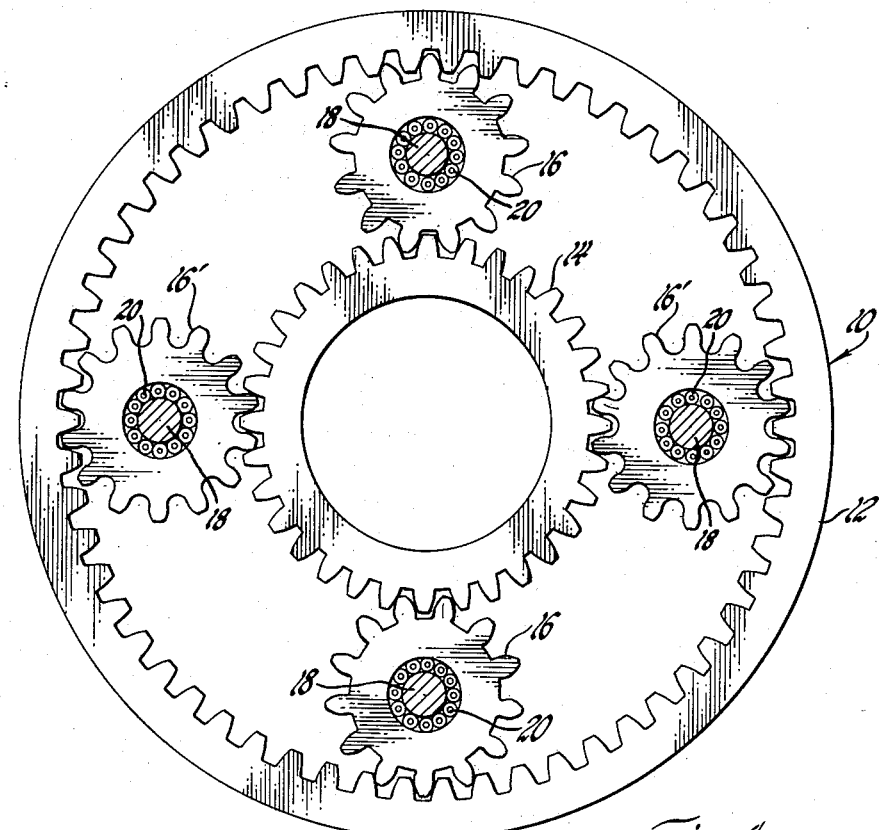
FIGURE 1 is a plan view of a planetary gearset incorporating the principles of the invention.
Figure 2:
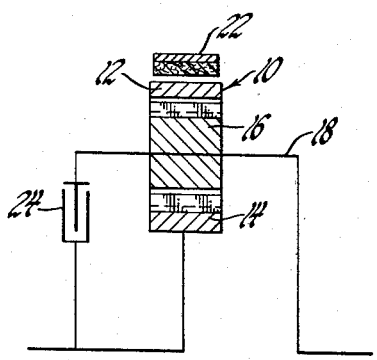
FIGURE 2 is a schematic diagram of the planetary gearset arranged to provide either a reduction drive or a direct drive.

Referring now to the drawings in detail and initially to FIGURE 2, the simple planetary gearset shown assigned the numeral 10 includes a ring gear 12 and a sun gear 14, each being coaxial and concentrically arranged relative to each other. Intermeshing with the ring and sun gears 12 and 14 is a plurality of planet pinions 16. Preferably, the planet pinions 16 are revolvably supported on a planet carrier 18 through the agency of needle bearings 20 as seen in FIGURE 1. Reaction for the planetary gearset 10 is provided by a reaction brake 22, which upon engagement with the ring gear 12 will prevent the rotation thereof.

As is well known, different ratios can be obtained with a simple planetary gearset merely by changing the input, the output, and the reaction. For example, assuming that the sun gear 14 is the input and that the ring gear 12 is the reactor, the pinion 16 will be caused to walk around the stationary ring gear 12 and carry therewith the planet carrier 18, which will become the output. This will result in the planet carrier 18 being revolved at a reduced speed with respect to the sun gear 14. If the brake 22 is utilized to hold the sun gear 14 and the ring gear 12 becomes the input, a different reduction ratio can be obtained.

Conversely, if the planet carrier 18 becomes the input and the sun gear 14 the output, at the time when the reaction brake 22 is holding the ring gear 12, an overdrive ratio is possible. Again, the sun and ring gears 12 and 14 can change functions so that the ring gear 12 becomes the output and the sun gear 14, the reactor. The result will be a slightly different overdrive ratio.

Whether the planetary gearset 10 is utilized as a reduction unit or an overdrive unit, a direct drive is attainable by clutching together any two of the elements such as joining the carrier 18 and the sun gear 14 with a direct drive clutch 24. Other possibilities are the joining of the ring gear 12 and the sun gear 14 or the clutching of the ring gear 12 to the carrier 18. In each of these examples a direct drive is attained, the primary difference being in the required capacity of the direct drive clutch 24.

As has been mentioned, the number of pinions that may be circumferentially spaced on the planet carrier 18 is determined by the space index of the planetary gearset 10. The equation:

$$\text{Space Index} = N_R + N_S$$

in which $N_R$ corresponds to the number of teeth on the ring gear 12 and $N_S$ to the number of teeth on the sun gear 14, may be employed for this determination. To illustrate an application of the equation, it will be assumed that, as shown in FIGURE 1, the ring gear 12 has 58 teeth and the sun gear 14, 32 teeth. Inserting these two values in the space index equation, a space index of 90 is attained. This means that 90 is the maximum number of pinions that can be equally spaced between ring and sun gears having these tooth numbers. Of course, the use of 90 pinions is impractical not only from a quantity standpoint but also from a space standpoint since such a large number would have to be staggered and require that the axial dimensions of the gearset 10 be substantially increased. Actually, the torque loads to be assumed by a gearset establish the number of pinions, which number in most instances is less than ten. If, after evaluating the torques to be transmitted by the planetary gearset 10, four equally spaced pinions are deemed adequate, then it will be noted that the number four is not a whole number factor of the space index 90; therefore, four pinions cannot be equally spaced 90° apart without a conflict between the teeth on the pinions and the mating gears.

By the invention, it is possible to change, in effect, the space index without altering either the ring gear 12 or the sun gear 14, and thus afford more opportunities for installing equally spaced pinions. To explain further, it should be kept in mind that with the foregoing example, the pinions 16 will have 13 teeth, this being half of the difference between the numbers of teeth on the ring gear 12 and the sun gear 14. Since the pinions 16 have an odd number of teeth, the two pinions 16 will be arranged exactly as seen in FIGURE 1, 180° apart. If pinions with even numbers of teeth are considered, e.g., either 12 or 14 teeth, the pinions with 12 or 14 teeth will be one-half pitch different from the pinion 16 with 13 teeth. If the 14 toothed pinions are chosen, they will appear as shown in FIGURE 1 and as designated generally by the numeral 16'. The one-half pitch difference enables these two gears to be placed 180° apart with respect to each other and 90° spaced from the pinions 16. The result is that the space index has been in a sense doubled from 90 to 180 since now 90 additional pinions 16' can be conceivably interposed between the ring and sun gears 12 and 14. Of course, the number four is a whole number factor of 180 and the selection of four equally spaced pinions does conform to the prior mentioned rule.

It can now be appreciated that the pinions 16 with 13 teeth cannot be installed in the positions of the pinions 16' with the 14 teeth since there would be interference between the intermeshing teeth necessitating that the pinions be offset slightly circumferentially. This unequal spacing often produces problems particularly when large torque loads are involved and therefore is often undesirable.

Figure 3:
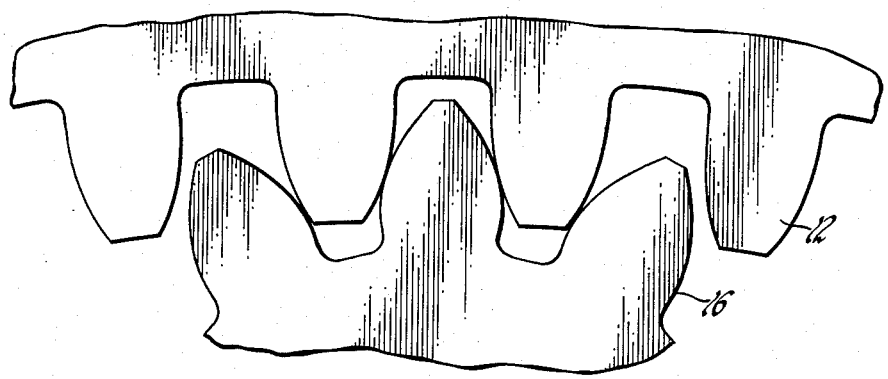
FIGURES 3, 4, and 5 are views of the tooth profiles of pinions with different numbers of teeth altered so that each is able to mesh with a gear having a particular number of teeth.
Figure 4:
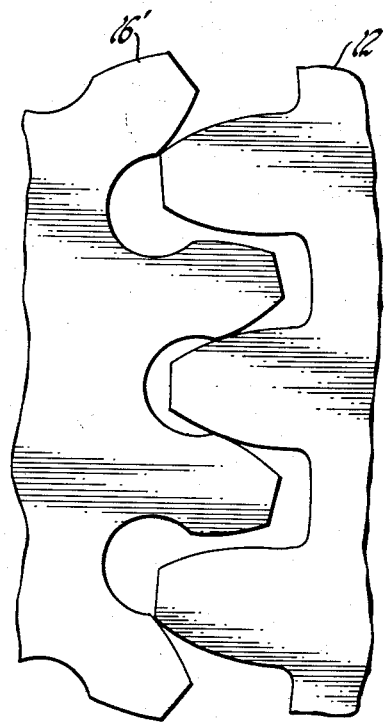
Figure 5:
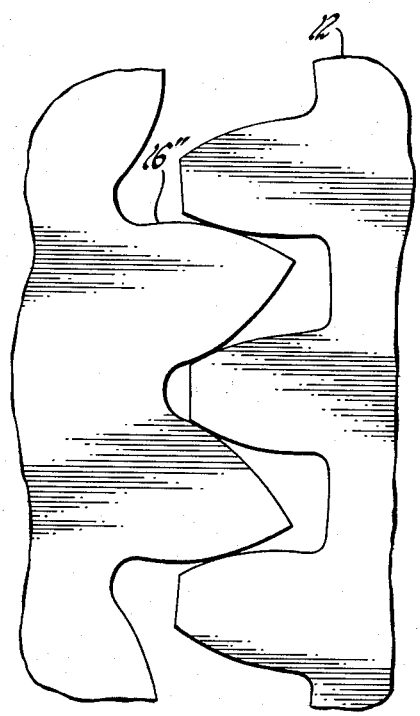

The foregoing is also true with 12 tooth pinions; however, there is another factor to be considered when deciding upon which size pinion is to be used and that is the tooth contours. This is illustrated by FIGURES 3, 4, and 5, which permit a visual comparison. The conventional pinion 16 with 13 teeth is viewed in FIGURE 3. In FIGURE 4, the pinion 16' having 14 teeth has short addendum teeth, whereas as seen in FIGURE 5 the pinion 16'' having 12 teeth will have long addendum teeth, keeping in mind that the outside and root diameters are the same in each case, that the pinions 16, 16', and 16'' all have different base circles and different pitch diameters but the same diametral pitch and the same pinion pin diameter, and further that the pinion 16'' will have the smallest pitch diameter. Of course, the installation will determine which tooth contour should be selected.

Not only does this arrangement permit equal spacing of pinions, the number of which is not a whole number factor of the space index, i.e., in the aforedescribed example four (pinions) is the fractional factor of 90, but also because the tooth action is different, a reduction in gear noise from synchronous vibrations can be obtained. In explaining this noise reduction, it should be recognized that, although the frequency of tooth engagement, i.e., the frequency at which the teeth enter and leave mesh with a mating gear, of the pinion 16 with 13 teeth is the same as that of the pinion 16' with 14 teeth and the pinion 16'' with 12 teeth, the pinion 16' with the 14 teeth does revolve slower and the 12 tooth pinion 16'' faster than the pinion 16 with 13 teeth. In fact, when the pinion 16 makes one full revolution, the pinion 16' with the 14 teeth will have only made $13/14$ of a revolution, whereas the 12 tooth pinion 16'' will have revolved $13/12$ times. This aspect plus the difference in tooth contours results in different sliding velocities, operating pressure angles, operating helixes, and circular pitches as between mating pinions and gears. Additionally, the fact that one pinion is going at a different speed from the other alters the frequency at which the needle bearings 20 operate. Therefore, by correlating the different frequencies obtained with these different gear sizes, quieter and more durable gear units can be produced.

The advantages derived from the invention are pronounced since the system can be employed both to reduce gear noise and to permit equal spacing of the pinions when the normal space index would otherwise not permit such. Or, if equal pinion spacing is not a problem, gear noise can be reduced and this is always a desirable achievement.

The invention is to be limited only by the following claims.

I claim:
1. In combination, input and output members, gearing for transferring drive between the members, the gearing including a pair of gear elements and a carrier having drive transmitting pinions journaled thereon so as to intermesh with the gear elements, the pinions being so formed as to permit equal spacing of a quantity of pinions that is a fractional factor of the sum of the numbers of teeth on the pair of gear elements.

2. In combination, input and output members, gearing for transferring drive between the members, the gearing including gear elements and a carrier having drive transmitting pinions journaled thereon so as to intermesh with the gear elements, one of the pinions being so formed as to have a different number of teeth from another of the pinions.

3. In combination, input and output members, gearing for transferring drive between the members, the gearing including gear elements and a carrier having drive transmitting pinions journaled thereon so as to intermesh with the gear elements, one of the pinions having a different number of teeth thereon from another of the pinions so as to permit pinions to be employed in a quantity that is a fractional factor of the sum of the numbers of teeth on the gear elements.

4. In combination, input and output members, gearing for transferring drive between the members, the gearing including gear elements and a carrier having drive transmitting pinions journaled thereon so as to intermesh with the gear elements, the pinions being so formed as to permit the quantity of pinions equally circumferentially spaced on the carrier to be a fractional factor of the sum of the teeth numbers on the gear elements.

5. In combination, input and output members, gearing for transferring drive between the members, the gearing including concentric gear elements and a carrier having drive transmitting pinions journaled thereon so as to intermesh with the gear elements, one of the pinions having a different number of teeth from another of the pinions so as to permit the quantity of pinions equally circumferentially spaced on the carrier to be a fractional factor of the sum of the numbers of teeth on the gear elements.

6. In a planetary gearing system, the combination of concentrically arranged input, output, and reaction elements, one of the elements serving as a planet carrier and having a plurality of planet pinions journaled thereon, one of the pinions having odd numbers of teeth and another of the pinions having even numbers of teeth.

7. In a planetary gearing system, the concentrically arranged combination of input, output, and reaction elements, one of the elements serving as a planet carrier and having journaled thereon a plurality of pinions, one of the pinions having a different number of teeth from the other.

8. In a planetary gearing system, the combination of input, output, and reaction elements, one of the elements serving as a planet carrier and having a plurality of pinions journaled thereon and spaced at equal intervals with respect to each other, one of the pinions having odd numbers of teeth and another of the pinions having even numbers of teeth.

9. In a planetary gearing system, the combination comprising a planet carrier having a plurality of equally spaced pinions journaled thereon, first and second gears meshing with the pinions, one of the pinions having different numbers of teeth from another of the pinions.

10. In a planetary gearing system, the combination of a sun gear, a ring gear, and a planet carrier having a series of equally spaced pinions journaled thereon and intermeshing with the ring and sun gears, one of the planet pinions having a different number of teeth from another of the pinions so that different tooth actions are produced between the pinions and the intermeshing gears.

11. The method of making a planetary gear set comprising measuring the space index of the gear set, forming planet pinions for the gear set with one of the pinions having both a different number of teeth thereon and a different tooth contour from another of the pinions so that the number of equally spaced pinions permitted in the gear set is a fractional factor of the gear set space index, and installing the pinions in the gear set at equal radial and angular distances apart.

References Cited in the file of this patent
UNITED STATES PATENTS

| | | |
|---|---|---|
| 1,644,222 | Baker | Oct. 4, 1927 |
| 1,849,882 | Pearson | Mar. 15, 1932 |